Nov. 10, 1925.
M. J. SMITH
PLUMBING CONNECTION
Filed March 14, 1925
1,561,436
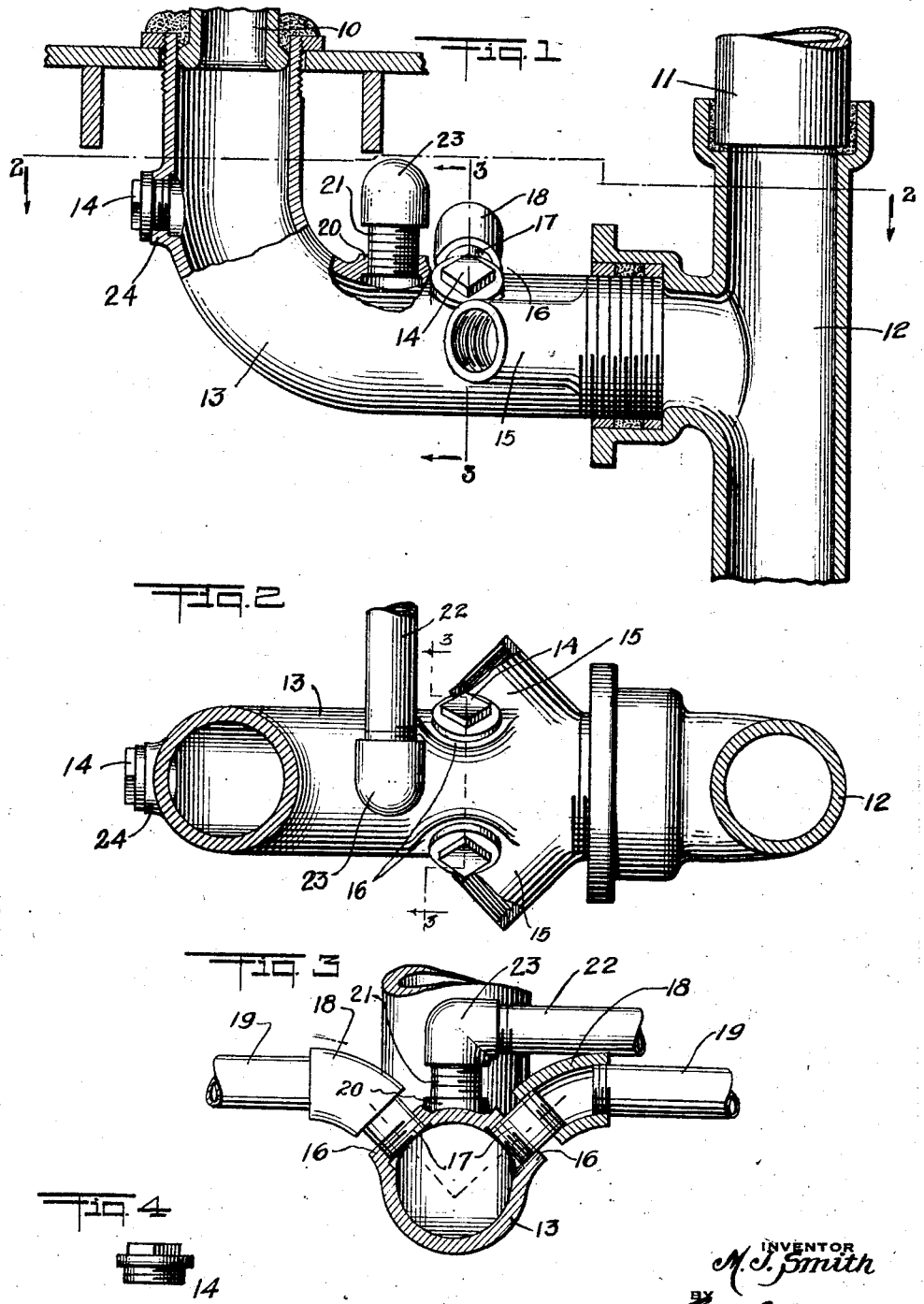

Patented Nov. 10, 1925.

1,561,436

UNITED STATES PATENT OFFICE.

MICHAEL J. SMITH, OF MORRISTOWN, NEW JERSEY, ASSIGNOR TO IRON CLOSET BEND COMPANY, OF MORRISTOWN, NEW JERSEY, A CORPORATION OF NEW JERSEY.

PLUMBING CONNECTION.

Application filed March 14, 1925. Serial No. 15,432.

*To all whom it may concern:*

Be it known that I, MICHAEL J. SMITH, a citizen of the United States, residing at Morristown, in the county of Morris and State of New Jersey, have invented certain new and useful Improvements in Plumbing Connections, of which the following is a specification.

This invention relates to plumbing apparatus and more particularly to multiple soil and waste connections.

This invention furnishes a connection or fitting between a water closet or other plumbing fixture and a soil pipe more or less remote relatively to said water closet, said fitting being adapted for easy, rapid, cheap, and sanitary installation, and embodying vent outlets and waste inlets so located and constructed as to permit the making of rapid and interchangeable connections thereto from variously located vent and waste pipes with the result that not only is the piping installation made more compact and satisfactory, especially where space is limited, but the cost of several pipe fittings and considerable labor eliminated.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation partly in vertical section of my fitting showing its construction and one manner of installation.

Fig. 2 is a horizontal section on the line 2—2 of Fig. 1 showing a vent connected to the fitting while two of the remaining openings are plugged up and other two are unplugged.

Fig. 3 is a vertical section on the lines 3—3 of Figs. 1 and 2 showing a vent and two waste connections.

Fig. 4 is a view of a plug.

Referring now more specifically to the drawings, I show a fragment of a closet bowl 10, a soil line 11, any suitable or standard T-Y fitting 12, and a connection or elbow 13 of any suitable form leading from the bowl to the fitting. The details of the connections of my improved fitting 13 to the neck of the bowl and the branch of the T-Y connection are or may be substantially similar to the subject matter fully set forth in Letters Patent of the United States, No. 1,460,986, granted to me on July 3rd, 1923, and over which this invention is an improvement.

The connection 13 is made of any suitable strong rigid material such as metal and preferably as a casting capable of being machined, tapped, or the like.

At any convenient distance from the delivery end, the connection 13 has formed upon its upper portion bosses or enlargements 16 each of which makes preferably an angle of 45° with the vertical. These bosses are machined or drilled and tapped at right angles thereto, or with their axes at 90° apart so as to permit the making of lateral connections above the center line thereof through nipples 17 and couplings 18. The standard 45° couplings 18 permit the making of connections with the horizontal pipes 19. Either of these pipes may be a waste pipe and the other a vent pipe, or if it is desired both may be waste pipes, and a vent pipe may be connected to another opening located between them and the inlet end of the connection. In any case the vent should be located as near the inlet end of the connection 13 as practicable, in view of the local structural conditions. The axes of the nipples 17 intersect at a point, as shown, well below the axis of the connection 13, and yet the nipple openings lie well above such axis.

My improved connection embodies a boss 20 for the attachment of a vertical threaded nipple 21 for a vent pipe 22 which may lead laterally in any direction from the elbow coupling 23.

In order to provide still greater flexibility and choice of arrangement of connecting to the main connection, I provide a boss 24 on the back portion of the connection to provide for back vent, which may lead therefrom in any convenient direction.

All the lateral waste and vent holes in my device are made preferably of the same size, so that one size of plugs 14 need be used or carried in stock for sealing any of the tapped holes that may not be required for connection purposes on any particular job or installation.

It will be noted that in Fig. 1 and Fig. 2 the vent connection could have been made at 24 to constitute a back vent and the plug 14 used at 20 instead of at 24 as shown. In Fig. 3, if the vent connection is made at 24 it is possible to run three different waste pipes into the connection. However, should the vent connection be made at 20, 24 would usually be plugged up, and two waste pipes 19 can then discharge into the connection through the 45° inlets 17.

At 15 I show two additional lateral connection openings arranged in the same horizontal plane, the plane of the axis of the horizontal portion of the connection 13 and with their axes at 90° apart. The connections at 15 and 16 may obviously have any desired relation to one another and at any desired points along the length of the main connection. It will be understood also that these connections 15 if not used for vent or other inlet connections will be plugged up as already described.

I claim:

A soil pipe fitting adapted to discharge a flow from a closet bowl into a pipe, said fitting comprising a substantially horizontal portion and a plurality of connections at said portion, to one of which a drainpipe can be connected and a vent pipe to the other, said connections being formed with their axes lying in substantially the same plane on opposite sides of the fitting, and intersecting at a point below the upper portion of the fitting but inclined at an angle to the horizontal so that said connections lie above the normal level of flow in said horizontal portion of the fitting, and the inclination of said connections insuring that a discharge from one of them will not enter the other connection.

In testimony whereof I affix my signature.

MICHAEL J. SMITH.